United States Patent [19]

Holbrook

[11] 4,421,021

[45] Dec. 20, 1983

[54] CITRUS JUICE EXTRACTOR HAVING MEANS FOR SEPARATING JUICE PULP AND RAG FROM PEEL

[75] Inventor: Franklin K. Holbrook, La Habra, Calif.

[73] Assignee: Brown International Corporation, Convina, Calif.

[21] Appl. No.: 140,471

[22] Filed: Apr. 15, 1980

Related U.S. Application Data

[63] Continuation of Ser. No. 935,492, Aug. 21, 1978, abandoned.

[51] Int. Cl.³ .............................................. A23N 1/00
[52] U.S. Cl. ...................................... 99/504; 99/495; 99/501; 99/509; 209/669; 209/671
[58] Field of Search .......... 99/495, 496, 456, 501–505, 99/509, 510; 209/669, 671; 198/669

[56] References Cited

U.S. PATENT DOCUMENTS

| | | | |
|---|---|---|---|
| 3,117,671 | 1/1964 | Pearce et al. | 209/671 |
| 3,478,796 | 11/1969 | Rafanelli | 99/495 |
| 3,747,149 | 7/1973 | Tatyanko et al. | 209/669 |
| 4,088,070 | 5/1978 | Montagroni et al. | 99/509 |

Primary Examiner—Timothy F. Simone
Attorney, Agent, or Firm—Paul A. Weilein

[57] ABSTRACT

Improvements in a fruit processing juice extractor in which fruit is fed by a feed wheel to conveyors having elastomer cups for holding the fruits and moving them against a stationary cutting knife to provide severed sections which are transported to rotary reamers that remove the juice and juice-bearing material from the peel sections which are subsequently ejected by ejector wheels into a peel chute for delivery to a bar grid in the chute for diverting the peel sections directly to an outlet, or to a separator for separating the juice, pulp and rag from the peel. A hopper-shaped collector is arranged to conduct extracted juice, rag and pulp together with undesirable contaminants such as peel that may not have been properly ejected in the juice extraction cycle, fruit that may have been dropped at the feed wheel or during transfer to the cups of the conveyors or which may have broken loose during the reaming cycle, to a roller grid structure arranged to separate and positively deliver the undesired contaminants to an outlet which may be the same as the outlet for the peel sections, while permitting the juice, rag and pulp to pass between the grid rollers into an outlet path containing a helical screw conveyor which will positively propel the juice, rag and pulp to the outlet under adverse conditions, and particularly a freeze condition which may occur when the liquid content of the fruit is reduced by more than one-half.

35 Claims, 7 Drawing Figures

CITRUS JUICE EXTRACTOR HAVING MEANS FOR SEPARATING JUICE PULP AND RAG FROM PEEL

This is a continuation of application Ser. No. 935,492, filed Aug. 21, 1978, abandoned.

BACKGROUND OF THE INVENTION

The present invention relates generally to fruit juice extracting machines.

Exemplary of one well-known fruit juice extracting machine, as used commercially in the citrus industry, is that disclosed in the Wells U.S. Pat. No. 2,631,625, which is hereby incorporated into the present disclosure by reference.

Briefly, the juice extracting machine in this patent discloses a vertically mounted rotary fruit feeder which is arranged to deliver citrus fruit to the holding cups of a pair of complementary conveyors which carry the fruit to a cutting knife which separates the fruit into sections which are respectively carried by each conveyor into engagement with rotary reamers carried by a rotary head, which remove the juice and juice-bearing materials from the peel sections which are thereafter ejected by ejector wheels into a peel outlet chute, while the collected juice, pulp and rag are conducted to another chute.

In industrial juice extracting machines, such as that disclosed by the above-noted patent, grid means are usually provided for separating the extracted juice and pulp from the peel, and considerable time and effort has been expended to develop separating means which would more effectively and efficiently separate the peel and other contaminants from the juice, pulp and rag. For example, it has heretofore been known to provide an oscillating separator grid such as disclosed in the James U.S. Pat. No. 3,183,955.

While many of the prior developments for the separating means resulted in marked improvements in the operation, it has been found that the prior known arrangements had undesirable operating limitations and would not operate satisfactorily under cartain adverse conditions, for example, when undersized fruit, broken or rotten fruit, split or soft fruit were supplied to the juice extractor and collected as a contaminant in the juice, pulp and rag. The present invention seeks to overcome the disadvantages of the prior known separator arrangements by providing an improved and unique roller grid arrangement in which a plurality of synchronously rotated rollers operate to positively move the contaminants along a delivery path on the upper side of the rollers to a discharge opening, while at the same time permitting juice, rag and pulp to pass between the rollers into a discharge path containing a screw conveyor for positively moving the juice, pulp and rag to a discharge opening.

SUMMARY OF THE INVENTION

The present invention more specifically relates to improvements in separator means for the positive separation of fruit juice, rag and pulp from peel and other contaminants, and which is particularly adapted for use with citrus juice extracting machines of the reamer type.

It is one object of the herein described invention to provide in a fruit juice extractor, positive means for separating contaminant peel from the juice bearing pulp and rag, which will operate efficiently and continuously under adverse conditions such as the presence of undersize fruit which may be fed into the extractor in the form of doubles, the entrance of broken or rotten fruit, split or soft fruit becoming broken during the juice extraction operation or peel portions which are not discharged or ejected down the peel chute.

A further objective is to provide in a fruit juice extractor, positive means for the removal of collected juice together with separated pulp and rag under frozen fruit conditions, wherein the liquid to pulp and rag ratios are reduced by more than 50%, and undersuch conditions would normally tend to cause the extractor to become clogged.

Another object resides in the provision in a fruit juice extractor of unique separating means in which contaminants including peel portions are delivered with the extracted juice, pulp and rag particles to the upper side of a plurality of rotatable spaced rollers which are operative to pass the juice, pulp and rag therebetween into an underlying discharge path containing a screw conveyor, and in which the peel portions and other contaminants are moved in a discharge path on the upper side of the rollers.

Further objects and advantages of the invention will be brought out in the following part of the specifications, wherein detailed description is for the purpose of fully disclosing a preferred embodiment of the invention without placing limitations thereon.

BRIEF DESCRIPTION OF THE DRAWINGS

Referring to the acompanying drawings, which are for illustrative purposes only.

DESCRIPTION OF A PREFERRED EMBODIMENT

Figure 1:
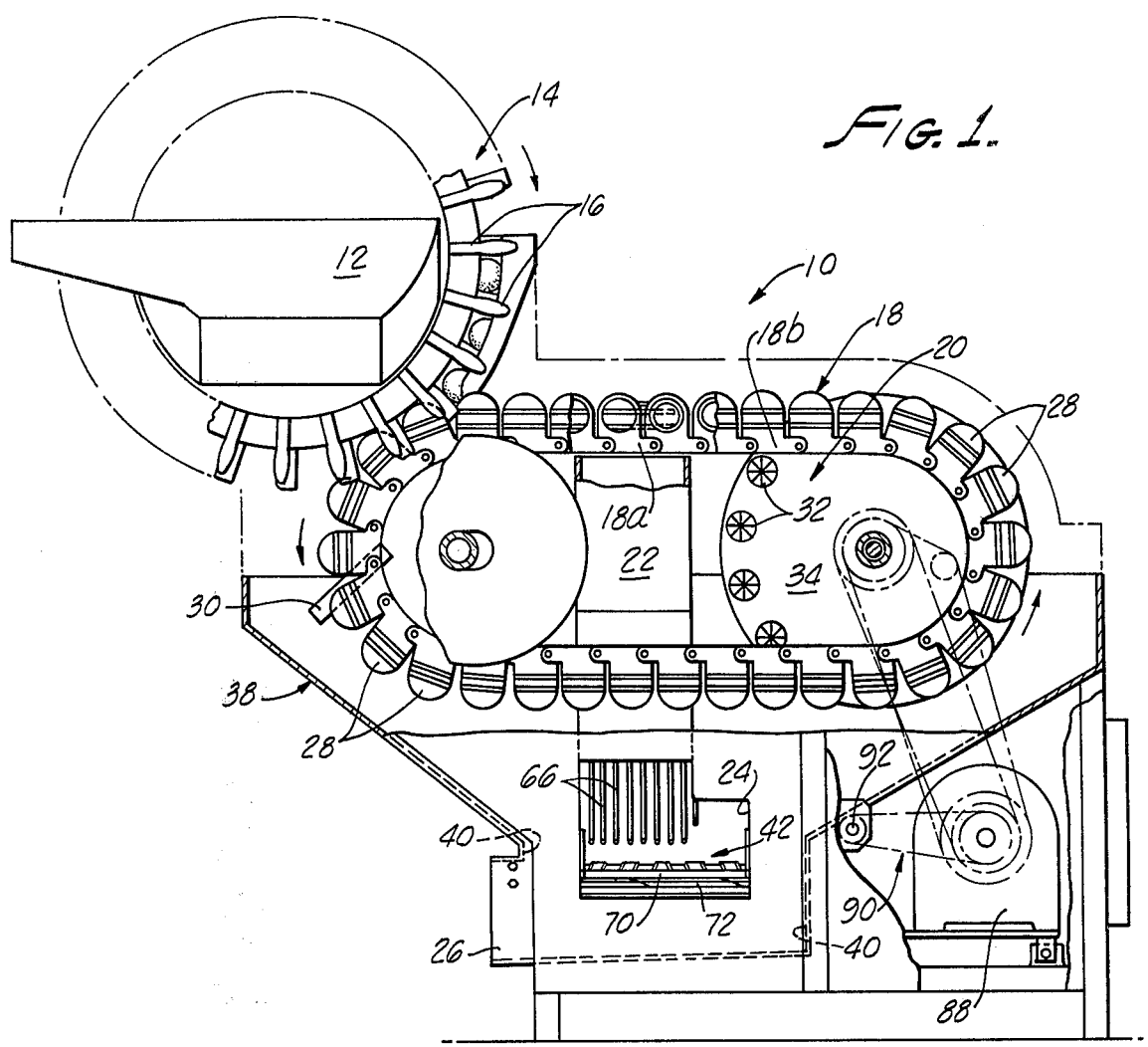
FIG. 1 is a side elevational view of a juice extractor embodying the features of the present invention, portions being broken away to disclose important details of the construction.
Figure 2:
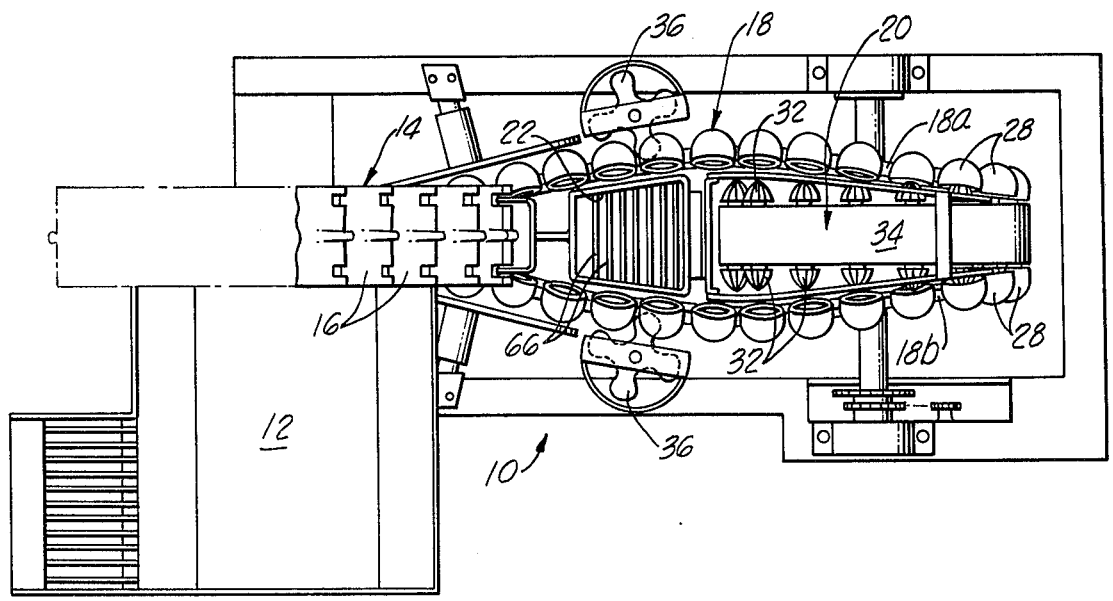
FIG. 2 is a top plan view of the same.
Figure 3:
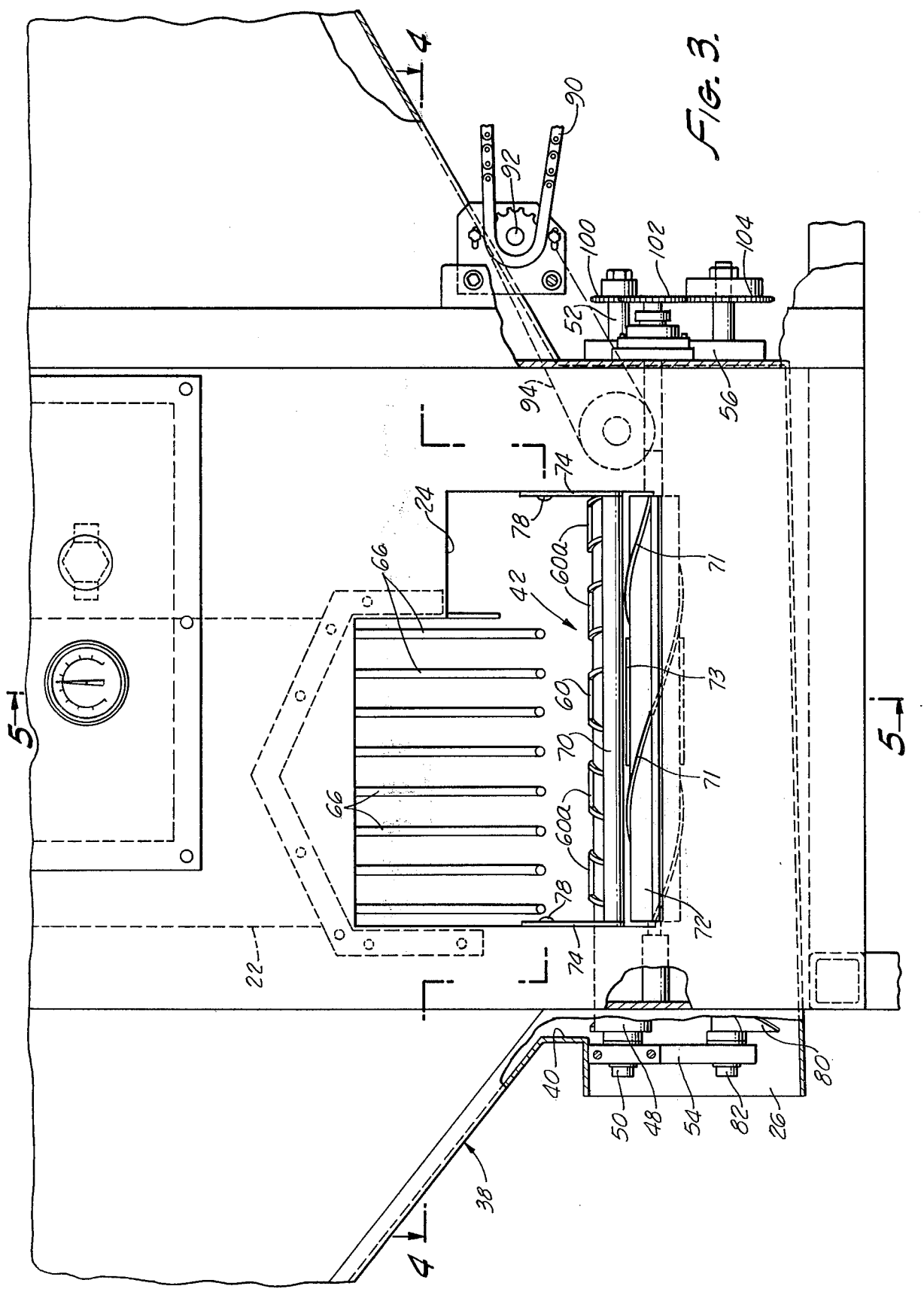
FIG. 3 is an enlarged fragmentary side elevational view looking towards the peel discharge opening, portions being cut away to discloses driving connections for actuating the components of the separating means.

Referring more specifically to the drawings, for illustrative pusposes, the invention is shown as being embodied in a juice extractor as generally indicated by the numeral 10 in FIGS. 1 and 2, wherein citrus fruit is arranged to be delivered from a supply hopper 12 to a vertically rotatable feed wheel 14 having circumferentially spaced peripheral radial blades 16 which are operative to successively feed the whole fruits to a cup-chain conveyor mechanism, as generally indicated by the numeral 18, wherein the fruit is cut into halves and the halves are conducted to a reamer mechanism 20 for extracting juice therefrom. After the juice is extracted, the peel sections are then ejected into a delivery chute 22 for conducting the peel sections in a delivery path leading to a peel outlet opening 24, while the extracted juice, pulp and rag are collected and conducted to a delivery path leading to a different outlet opening 26 (FIG. 3).

More specifically, the conveyor mechanism comprises a pair of conveyors 18a and 18b, each of which carries a series of elastomeric cups 28. The cups on the respective conveyors are in confronting relation and are arranged so that upon movement of the conveyors in a converging path, the cups will engage and hold the fruits as they are successively delivered from the feed wheel 14. The held fruit is then carried to a slicing knife 30 which severs each fruit into a half-section.

The conveyors are then moved in a converging path to bring the cut faces of the fruit sections into engagement with rotary reamers 32 on the opposite sides of a cylindrical rotatably mounted head 34, these reamers being operative to extract the juice from the fruit halves.

From the reamer mechanism, the conveyors 18a and 18b are moved in diverging paths to disengage the fruit sections from the reamers and carry them to an ejecting station where ejector star wheels 36 are operative to eject the peel sections into the delivery chute 22.

The structure thus far described has been generally known from prior patents as exemplified, for example, by the side entry hopper disclosed in U.S. Pat. No. 3,887,062, and the juice extracting machine as disclosed in U.S. Pat. No. 2,631,625, these patents being included by reference in the present application.

As best shown in FIG. 1, the conveyor mechanism 18 together with the reamer mechanism 20 are supported above an underlying juice collector in the form of a hopper 38 which is constructed with downwardly converging walls leading to a substantially rectangular passage 40 which forms an outlet for the collected juice, pulp and rag from the peel together with any undesirable contaminants such as peel that has not been properly ejected in the fruit extraction cycle, fruit that may have been dropped at the feed wheel or during transfer to the cups of the conveyors or which may have broken loose during the reaming cycle, as well as undersized fruits which may be deposited in multiples in the cup conveyors, as well as rotten fruit, split or soft fruit which may have become broken.

An important feature of the present invention resides in the provision of a unique separating means in the form of a grid structure, as generally indicated at 42, this grid structure being mounted directly below the passage 40 and in its communicating connection with an underlying lower collecting chamber 44, this chamber being in communication with the outlet opening 26. The passage 40 above the grid structure is in communication with the peel outlet opening 24.

Figure 4:
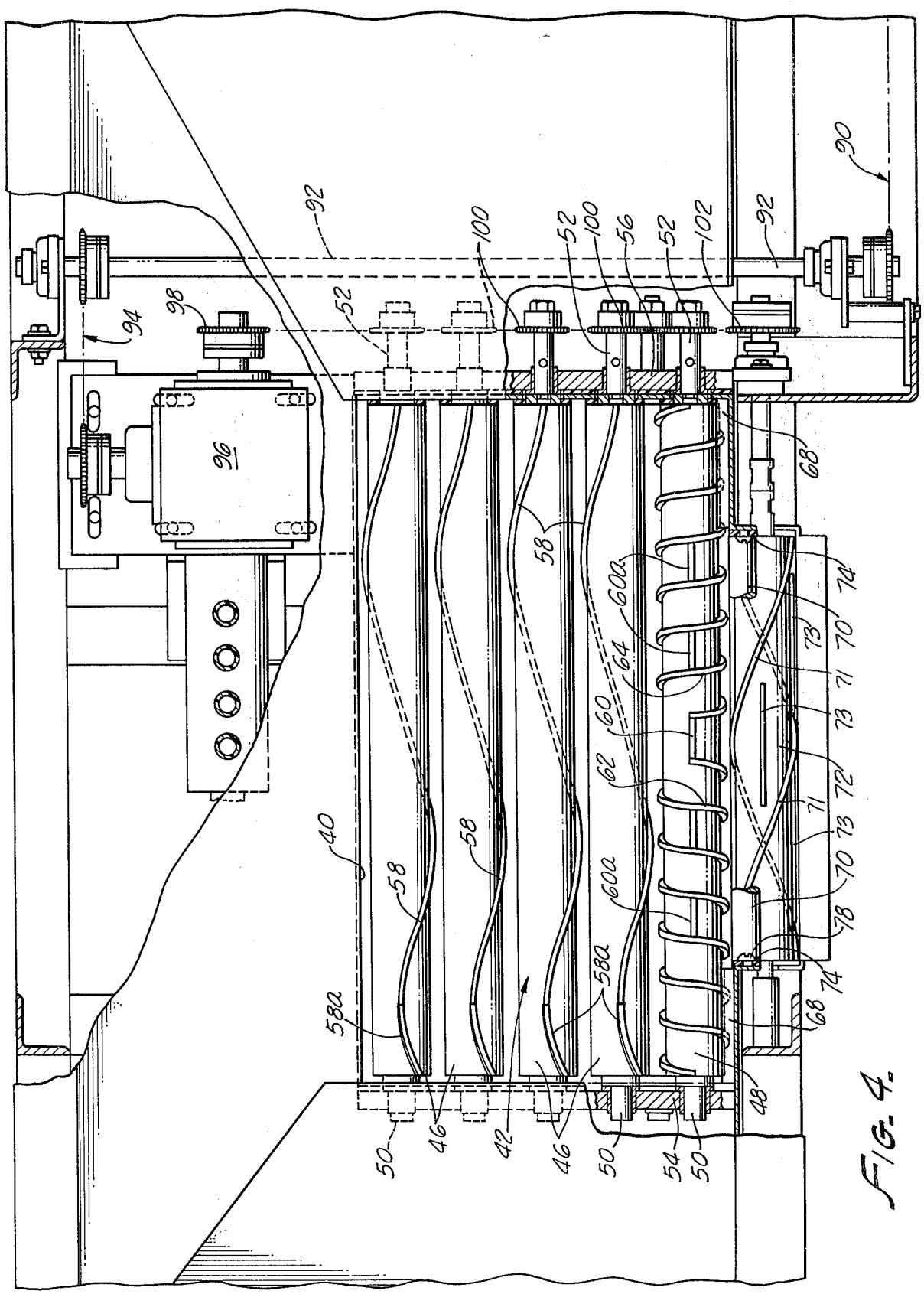
FIG. 4 is an enlarged fragmentary horizontal sectional view, taken substantially on line 4—4 of FIG. 3, and showing the cooperative relationship of the rotatable rollers of the separating means.

As best seen in FIG. 4, the grid structure 42 comprises a plurality of rotatable cylindrical rolls 46 and a single roll 48 which are supported in laterally spaced parallel relation by suitable end stub shafts 50 and 52 in each case in appropriate bearings on frame members 54 and 56 at the respective ends of the rolls. The rolls 46 are respectively provided with a longitudinally extending spiralled rib 58 which may comprise a rod having a round cross section, this rod being welded or otherwise secured to the surface of the roll. At the left end of each roll, as viewed in FIG. 4, the rib is formed by an end section 58a of substantially square cross section and having a reversed direction of spiral. The roller 48 is constructed with a surface rib configuration in which the ribs are formed from rod material of substantially square cross section. In this case, the rib structure comprises a central straight portion 60 that connects with oppositely spiralled rib sections 62 and 64 which extend to the opposite ends of the roll. Two additional straight axially aligned similar rib portions 60a are secured between alternate adjacent convolutions of each of the spiralled rib sections on opposite sides of the central rib 60. It will be noted, however, that such straight rib portions are omitted from the rib convolutions in the opposite end portions of the roller 48, in order to avoid possible jamming of twigs or other foreign objects which could impede the roller operation.

As thus arranged, the peel sections from which the juice has been extracted by the reamers are delivered to the delivery chute 22 and guided by a terminal bar grid 66 to a position onto the top of the grid structure 42 above the roller 48 and into the peel outlet opening 24. The hopper 38 conducts the extracted juice, pulp, rag and contaminants to the upper surface of the grid structure 42 into engagement with the rollers 46 and 48. These rollers are synchronously rotated in the same direction and the spiralled ribs are arranged as a result of this rotation to move the pulp, rag and contaminants towards the peel outlet opening 24. The juice passes between the rollers into the collecting chamber 44, as will also small portions of the pulp and rag. The ribs on the rollers 46 operate to not only convey the peel and rag laterally of the rollers, but also to effect the separation of peel and rag with the rag falling through between the rolls. The rib end portions 58a, during this operation, tend to cause the pulp, rag and other materials at these ends of the rollers to be redirected away from the roller ends and onto the next roller. The spiralled ribs of the roller 48 operate to move the materials from the roller ends towards its central portion, an the straight axially aligned portions 60 and 60a operate to kick the contaminants towards the peel outlet opening 24.

Additional means are provided at the peel outlet opening 24 to finally urge any remaining pulp and rag into the collecting chamber 44, and to guide peel sections and peel particles through the peel outlet opening, rather than into the juice collecting chamber 44. For this purpose, a pair of short, small, round bars or rods 68 are respectively mounted in axially aligned positions on the opposite sides of the peel discharge opening in close proximity to the periphery of the roll 48. The bars 68, as thus arranged, will not interfere with the free passage of small pieces of peel through the discharge opening. In addition, a bar or rod 70 of slightly larger diameter extends across the discharge opening and is adjustably mounted for vertical and swingable adjustments between the roller 48 and a longitudinally ribbed pulp recovery roller 72 for making the final peel-pulp separation. As best seen in FIG. 4, the roller 72 is provided with a pair of diametrically opposed similarly spiralled surface ribs 71 which extend longitudinally between the roller ends. A plurality of non-spiralled straight surface ribs 73 are also provided on the surface of the roller 72, these ribs 73 being positioned between the spiralled ribs 71 and being in staggered relation both circumferentially and longitudinally of the roller 72. Adjustability of the bar 70 is obtained by providing a fixed right angled end bracket 74 at each end of the bar, the bracket having an end opening slot 76 for the reception of a fastening screw 78.

Figure 6:
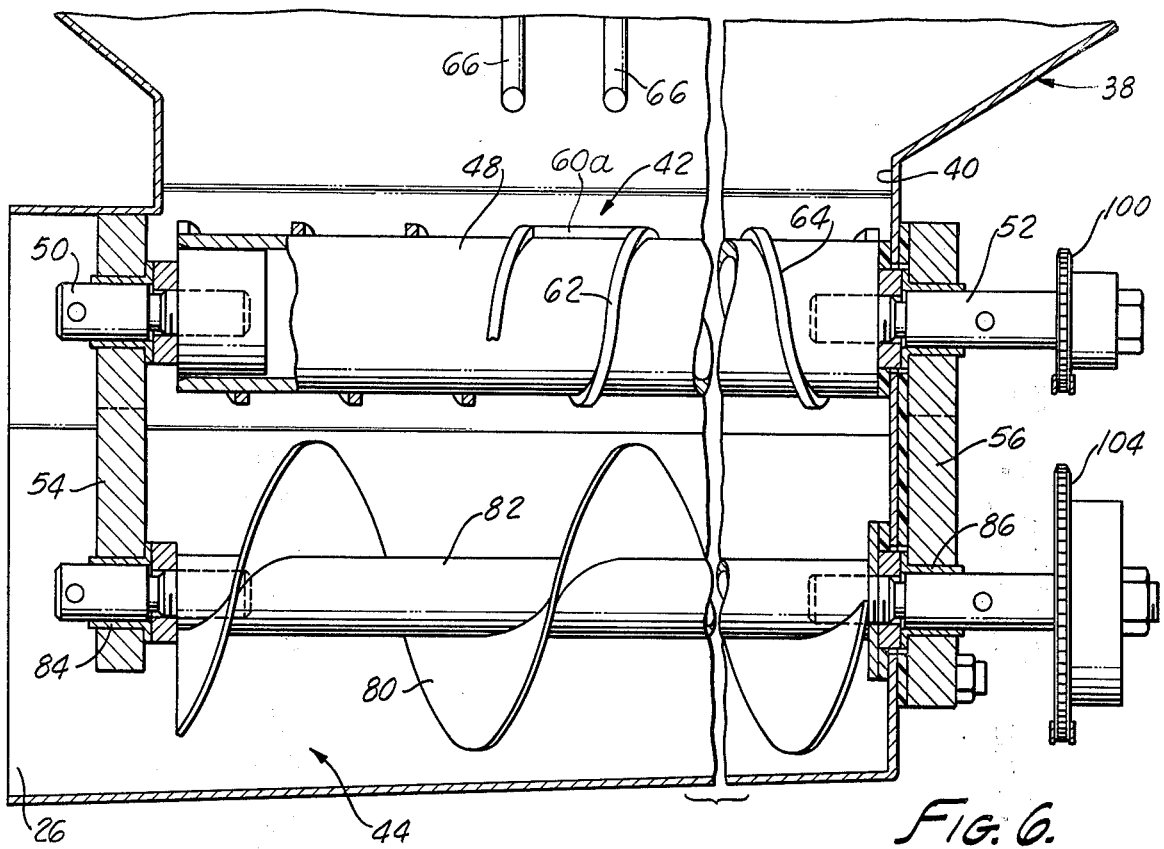
FIG. 6 is an enlarged fragmentary vertical section, taken substantially on the line 6—6 of FIG. 5.
Figure 7:
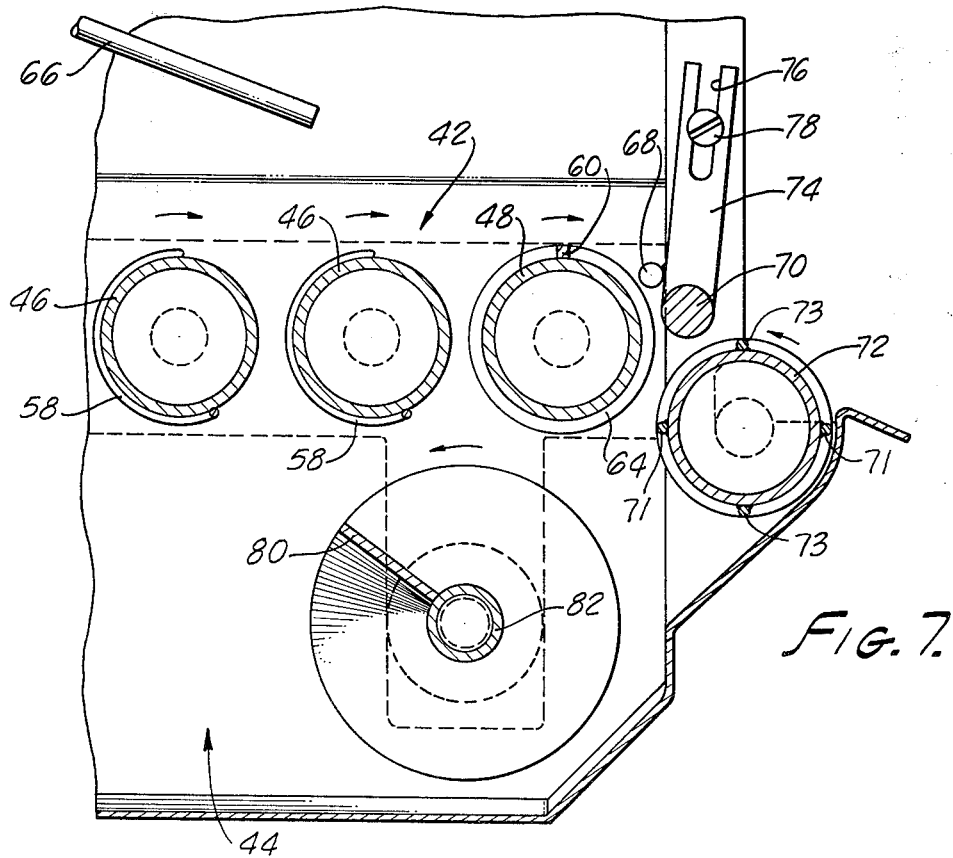
FIG. 7 is an enlarged fragmentary sectional view, similar to that shown in FIG. 5, to more clearly disclose the operative component relationship at the peel discharge opening.

Another important feature of the present invention is the provision of means for positively conveying the pulpy juice out of the collecting chamber 44 and discharging it through the outlet opening 26, whereby to prevent clogging under frozen fruit conditions in which there is an abnormally high pulp-to-liquid-juice ratio. For this purpose, a screw conveyor 80 is rotatably supported with its axis of rotation in axial alignment with the outlet opening 26. As shown in FIG. 6, the screw conveyor 80 is carried by a central shaft 82, one end of this shaft being supported in a sleeve bearing 84 on the frame member 54, and the other end of the shaft being supported in a sleeve bearing 86 on the frame member 56.

Figure 5:
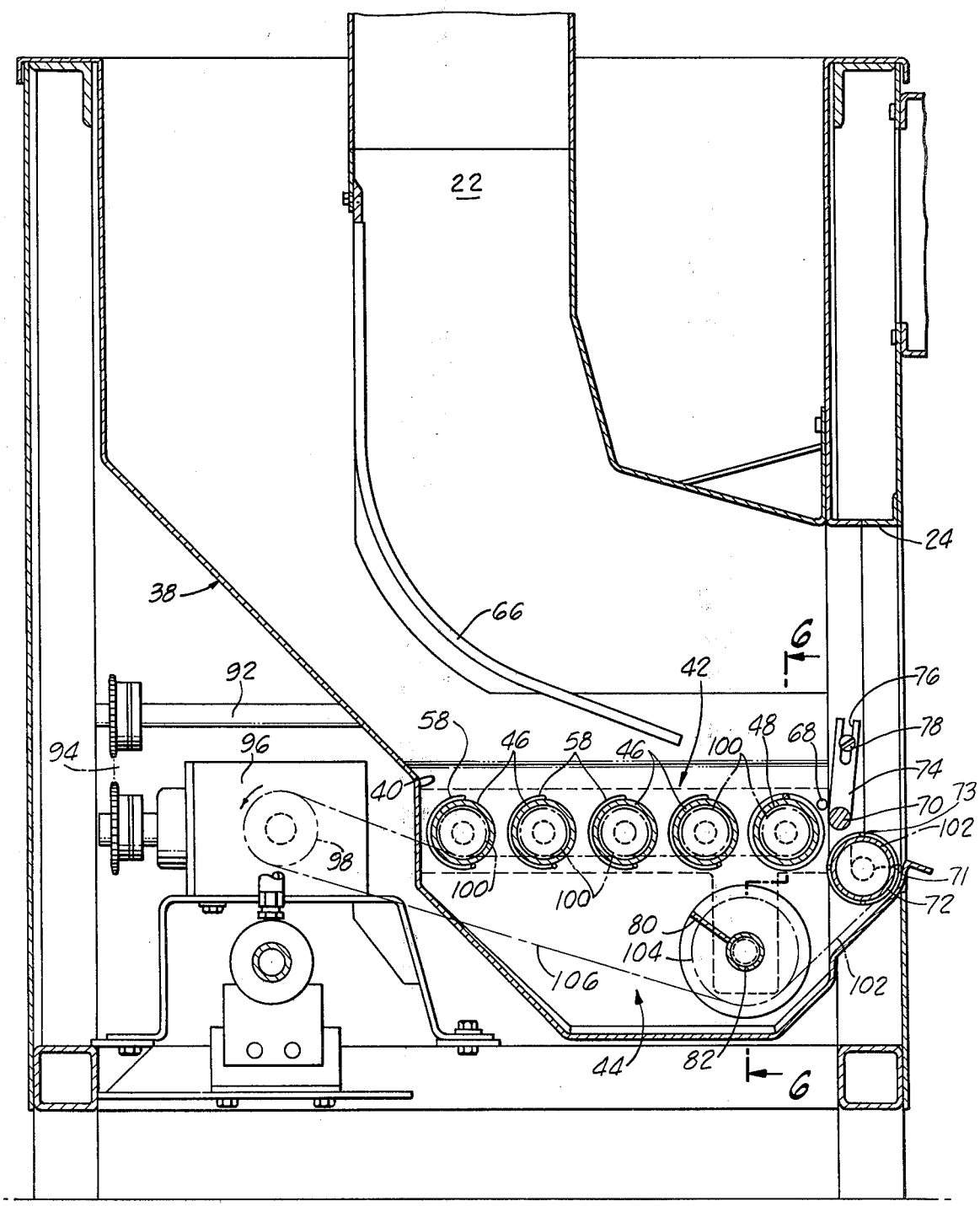
FIG. 5 is an enlarged transverse vertical section, taken substantially on line 5—5 of FIG. 3, and showing the orientation of the positive acting screw conveyor in the juice, pulp and rag discharge path.

The extractor of the present invention is operated by a main gear-motor 88 which is utilized to drive the main juice extractor components in a conventional manner. This motor has an output speed of substantially 100 rpm and is also utilized for the operation of the rollers 46, 48 and 72, as well as the screw conveyor 80. As shown in FIG. 1, the motor 88 is connected through a chain-sprocket drive 90 to a jack shaft 92 which is driven at an approximate speed of 184 rpm. As shown in FIGS. 3 and 4, the jack shaft 92 is connected through a chain-sprocket drive 94 to the input shaft of a 1:1 ratio gear box 96, the output shaft of which carries a sprocket wheel 98. The input speed to the gear box 96 is approximately 159 rpm. The rolls 46 and 48 are respectively connected to driving sprocket wheels 100, the roller 72 with a sprocket wheel 102 and the screw conveyor 80 with a driving sprocket wheel 104. As shown in FIG. 5, a serpentine sprocket chain driven by the gear 98 is drivingly connected with the sprocket wheels 100, 102 and 104 to drive the rolls 46 and 48 at approximately 250 rpm, the pulp recovery roll 72 at approximately 184 rpm, and the screw conveyor 80 at approxiately 125 rpm.

From the foregoing description and drawings, it will be clearly evident that the delineated objects and features of the invention will be accomplished.

Various modifications may suggest themselves to those skilled in the art without departing from the spirit of the disclosed invention and, hence, it is not wished to be restricted to the specific form shown or uses mentioned, except to the extent indicated in the appended claims.

What is claimed is:

1. In a citrus fruit juice extractor of the type having means for extracting juice, rag and pulp from citrus fruit, a discharge for citrus peel sections at one outlet and a discharge for rag and pulp particles and juice therefrom at another outlet, the juice, rag and pulp tending to include contaminants such as peel portions, whole fruit and whole fruit portions, the improvement comprising:
a roller grid structure positioned in spaced-apart relation below the juice extracting means, said roller grid structure comprising a plurality of rollers, means for supporting said rollers in rotatable, parallel spaced-apart relation and longitudinally extending surface means on said rollers,
means for collecting the juice, rag, pulp and included contaminants from the juice extracting means and conducting the juice, rag, pulp and included contaminants downwardly to said roller grid structure,
a contaminant outlet means formed above and adjacent one lateral side of said parallel rollers, the juice, rag and pulp outlet being formed below said parallel rollers, and
means for driving said rollers in rotation whereby said roller spacing and longitudinal surface means on said rollers allow the juice, rag and pulp to pass between the rollers while the contaminents are carried toward said contaminant outlet means.

2. The juice extractor of claim 1 in which said collecting and conducting means includes means arranged above said grid structure for delivering the contaminants to said grid structure adjacent said contaminant outlet means.

3. The juice extractor of claim 2 wherein said contaminant delivering means comprises a terminal bar grid inant mounted above said roller grid structure and inclining downwardly and laterally toward said contaminant outlet means.

4. The juice extractor of claim 3 wherein said contaminant outlet means communicates with the discharge outlet for receiving citrus peel sections from the extracting means.

5. The juice extractor of claim 1 further comprising means below said grid structure for positively moving the juice, rag and pulp toward the juice, rag and pulp outlet.

6. The juice extractor of claim 5 wherein the means to positively move the juice, rag and pulp particles comprises a screw conveyor.

7. The juice extractor of claim 1 wherein said plurality of rollers are of uniform diameter and are rotated in the same direction with their upper surface portions being moved in a direction toward said contaminant outlet means.

8. The juice extractor of claim 7 wherein said surface means on each of said plurality of rollers comprises a generally spiral longitudinally extending surface rib.

9. The juice extractor of claim 8 wherein said rib comprises a rod member of circular cross section.

10. The juice extractor of claim 1 wherein said plurality of rollers is spaced apart from said contaminant outlet means and further comprising an additional roller arranged adjacent said contaminant outlet means, said additional roller having a surface rib formed with a straight central portion in parallel relation to the roller axis, the ends of said central portion being connected respectively with oppositely spiralled rib portions extending substantially to the roller ends, said spiralled rib portions during roller rotation being operative to move material towards said central portion, said central portion being operative to kick the material towards said one outlet.

11. The juice extractor of claim 10 further comprising additional straight portions similar to and axially aligned with said central portion, said additional straight portions being positioned between adjacent convolutions of the oppositely spiralled rib portions on said other roller to augment the kicking action of said central portion.

12. The juice extractor of claim 11 wherein said rib on said additional roller has a substantially square cross section.

13. The juice extractor of claim 11 further comprising a ribbed final pulp recovery roller in parallel spaced relation adjacent and below said additional roller, said final pulp recovery roller being adapted for rotation in a direction opposite that of said additional roller and said plurality of rollers.

14. The juice extractor of claim 13 wherein said pulp recovery roller has a plurality of similarly spiralled, circumferentially spaced surface ribs extending longitudinally between its ends.

15. The juice extractor of claim 14 wherein straight axially extending surface rib portions are positioned between the spiralled ribs.

16. The juice extractor of claim 15 wherein said straight rib portions are in staggered relation both circumferentially and longitudinally of the roller.

17. The juice extractor of claim 13 wherein said plurality of rollers, said additional roller and said final pulp recovery roller respectively mount driving sprocket wheels; and
a common driving sprocket chain is engaged by corresponding sides of all the sprocket wheels except the sprocket wheel of the final pulp recovery roller, which is engaged on an opposite side by said chain.

18. The juice extractor of claim 17 wherein a screw conveyor is positioned in the delivery path below said structure, said conveyor being connected with a driving sprocket wheel; and
said common driving sprocket chain drives said final pulp recovery roller at a rotative speed less than that of said plurality of rollers, and also drives the screw conveyor.

19. The juice extractor of claim 11 wherein rod means are positioned between said additional roller and said final pulp recovery roller adjacent to and in parallel relation with said final pulp recovery roller for diverting rag and pulp into the delivery path leading to said juice, rag and pulp outlet.

20. The juice extractor of claim 19 wherein said rod means includes a pair of axially aligned rods respectively positioned on opposite sides of said contaminant outlet means and being closely spaced from and extending in parallel relation along end surface portions of said additional roller.

21. The juice extractor of claim 19 wherein said rod is adjustably supported for movement to relatively raised, lowered and laterally shifted positions.

22. The juice extractor of claim 19 wherein said rod means includes a plurality of spaced apart parallel extending rods, one of said parallel extending rods extending across said one opening, said parallel rods also including a pair of axially aligned rods respectively positioned outwardly of the opposite ends of said one rod.

23. A roller grid assembly adapted for mounting in spaced-apart relation below a citrus fruit juice extractor of the type having means for extracting juice, rag and pulp from citrus fruit, a discharge for citrus peel sections at one outlet and a discharge for rag and pulp particles and juice therefrom at another outlet, the juice, rag and pulp tending to include contaminants such as peel portions, whole fruit and whole fruit portions, said roller grid assembly being arranged below and in communication with the extracting means by collecting and conducting means to receive substantially all of the juice, rag, pulp and included contaminants therefrom, said roller grid assembly further comprising a plurality of rollers, means for supporting said rollers in rotatable, parallel spaced-apart relation, and longitudinally extending surface means on said rollers, a contaminant outlet means being formed above and adjacent one lateral side of said parallel rollers, the juice, rag and pulp outlet being formed below said plurality of rollers, and means for driving said plurality of rollers in rotation whereby said roller spacing and longitudinal surface means on said plurality of rollers allow the juice, rag and pulp to pass between the rollers while the contaminants are carried toward said contaminant outlet means.

24. The roller grid assembly of claim 23 further comprising means arranged below said grid structure for positively moving the juice, rag and pulp toward the juice, rag and pulp outlet.

25. The roller grid assembly of claim 24 wherein the means to positively move the juice, rag and pulp particles comprises a screw conveyor.

26. The roller grid assembly of claim 22 wherein said plurality of rollers are of uniform diameter and are adapted for rotation in the same direction with their upper surface portions being moved in a direction toward said contaminant outlet means.

27. The roller grid assembly of claim 26 wherein said surface means on each of said plurality of rollers comprises a generally spiral longitudinally extending surface rib.

28. The roller grid assembly of claim 27 wherein said rib comprises a rod member of circular cross-section.

29. The roller grid assembly of claim 23 wherein said plurality of rollers is spaced apart from said contaminant outlet means and further comprising an additional roller arranged adjacent said contaminant outlet means, said additional roller having a surface rib formed with a straight central portion in parallel relation to the roller axis, the ends of said central portion being connected respectively with oppositely spiralled rib portions extending substantially to the roller ends, said spiralled rib portions during roller rotation being operative to move material towards said central portion, said central portion being operative to kick the material towards said one outlet.

30. The roller grid assembly of claim 29 further comprising additional straight portions similar to and axially aligned with said central portion, said additional straight portions being positioned between adjacent convolutions of the oppositely spiralled rib portions on said additional roller to augment the kicking action of said central portion.

31. The roller grid assembly of claim 30 wherein said rib on said additional roller has a substantially square cross-section.

32. The roller grid assembly of claim 29 further comprising a ribbed final pulp recovery roller in spaced-apart parallel relation adjacent and below said additional roller, said final pulp recovery roller being adapted for rotation in a direction opposite that of said additional roller and said plurality of rollers.

33. The roller grid assembly of claim 32 wherein said final pulp recovery roller has a plurality of similarly spiralled circumferentially spaced surface ribs extending longitudinally between its ends.

34. The roller grid assembly of claim 33 wherein said additional roller and said plurality of rollers have axes of rotation lying in a common plane, said final pulp recovery roller having an axis of rotation positioned below said plane.

35. The roller grid assembly of claim 33 further comprising rod means positioned between said additional roller and said final pulp recovery roller for diverting rag and pulp into said juice, rag and pulp outlet.

* * * * *